US011549466B2

United States Patent
Reitz et al.

(10) Patent No.: US 11,549,466 B2
(45) Date of Patent: Jan. 10, 2023

(54) SEAL AND METHOD FOR A FUEL GAS SUPPLY TO A PRE-COMBUSTION CHAMBER

(71) Applicant: Caterpillar Energy Solutions GmbH, Mannheim (DE)

(72) Inventors: Harald Reitz, Mannheim (DE); Ralf Trinkel, Birkenhelde (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 0 days.

(21) Appl. No.: 17/431,778

(22) PCT Filed: Feb. 10, 2020

(86) PCT No.: PCT/EP2020/025059
§ 371 (c)(1),
(2) Date: Aug. 18, 2021

(87) PCT Pub. No.: WO2020/169249
PCT Pub. Date: Aug. 27, 2020

(65) Prior Publication Data
US 2022/0136461 A1    May 5, 2022

(30) Foreign Application Priority Data
Feb. 18, 2019  (GB) ..................................... 1902211

(51) Int. Cl.
*F02M 21/02*   (2006.01)
*F02B 19/10*   (2006.01)

(52) U.S. Cl.
CPC ..... *F02M 21/0245* (2013.01); *F02B 19/1004* (2013.01)

(58) Field of Classification Search
CPC ........... F02M 21/0245; F02M 21/0296; F02M 21/0281; F02M 21/0218; F02M 21/02;
(Continued)

(56) References Cited

U.S. PATENT DOCUMENTS 4,830,410 A * 5/1989 Wermelinger ........ F16L 41/021
285/179
5,165,372 A   11/1992 Miyaoh
(Continued)

FOREIGN PATENT DOCUMENTS

EP   1787055 B1   3/2009
EP   2787192 A1   10/2014
(Continued)

OTHER PUBLICATIONS

Great Britain Search Report related to GB Application No. 1902211.0 dated Aug. 6, 2019.
(Continued)

*Primary Examiner* — Xiao En Mo

(57) ABSTRACT

Fuel gas (G) is supplied via a pipe to a pre-combustion chamber of an internal combustion engine. The pre-combustion chamber is formed inside a chamber body which is received in a cavity of the engine body, while the pipe is received in a passageway of the engine body which communicates with the cavity. A seal which may be made from an elastomer comprises a wall defining an interior space opening through the wall at first, second and third openings. A first portion of the wall defining the first and second openings is arranged in the cavity so that the chamber body can be inserted through the openings into the interior space of the seal, while a second portion of the wall comprising the third opening is received in the passageway so that the pipe can be inserted into the interior space of the seal via the third opening. The pipe is sealed in fluid communication with the pre-combustion chamber via an inlet in the chamber body by sealing regions of the seal.

9 Claims, 5 Drawing Sheets

(58) Field of Classification Search
CPC ... F02M 55/004; F02B 19/1004; F02B 43/00; F02B 19/108; F02B 19/12; F02B 19/00
See application file for complete search history.

(56) References Cited

U.S. PATENT DOCUMENTS

| | | | |
|---|---|---|---|
| 5,662,082 A | 9/1997 | Black | |
| 6,702,293 B2 | 3/2004 | Endo | |
| 7,270,107 B2 | 9/2007 | Riggs | |
| 2002/0104507 A1* | 8/2002 | Riggs | F02B 19/12 123/266 |
| 2014/0020647 A1 | 1/2014 | Akiyama | |
| 2016/0195208 A1* | 7/2016 | Cassiday | F16L 41/02 285/125.1 |
| 2016/0252045 A1 | 9/2016 | Jacob | |
| 2019/0009479 A1* | 1/2019 | DuPont, Jr. | B29C 70/845 |
| 2020/0362750 A1* | 11/2020 | Rabhi | F02B 19/18 |

FOREIGN PATENT DOCUMENTS

| | | | |
|---|---|---|---|
| JP | 08121127 A | 5/1996 | |
| JP | 3586926 B2 | 11/2004 | |
| WO | 2014037068 A1 | 3/2014 | |
| WO | 2016095054 A1 | 6/2016 | |

OTHER PUBLICATIONS

International Search Report related to PCT/EP2020/025059 dated Mar. 24, 2020.

\* cited by examiner

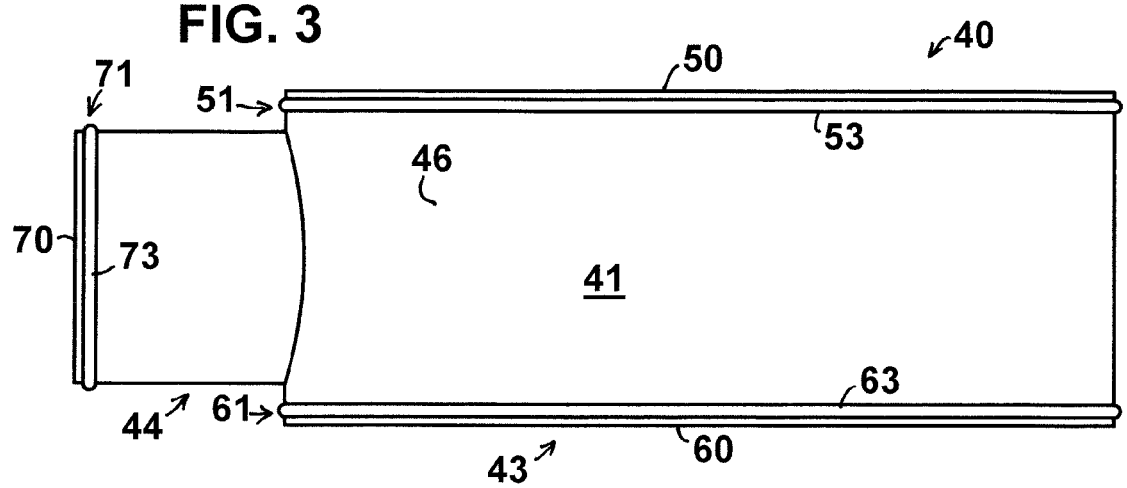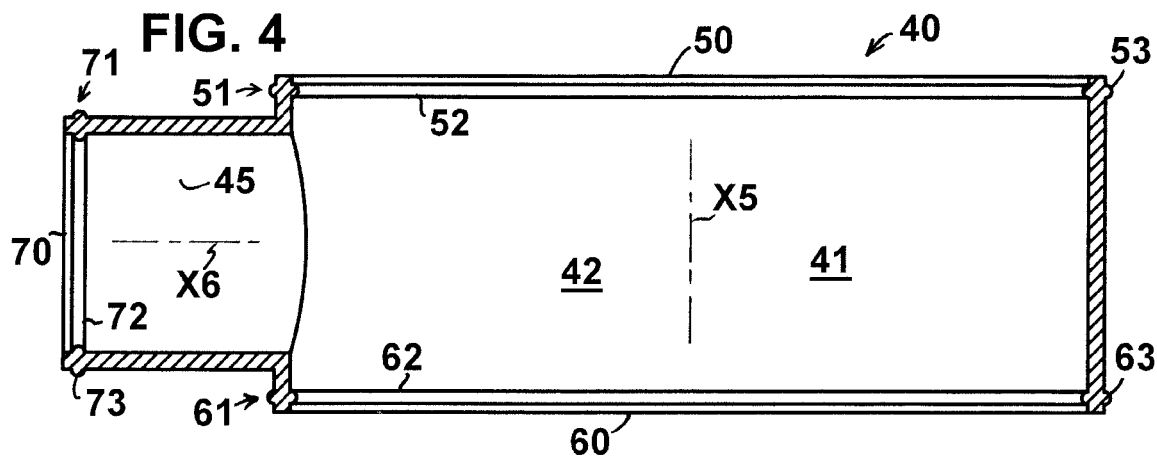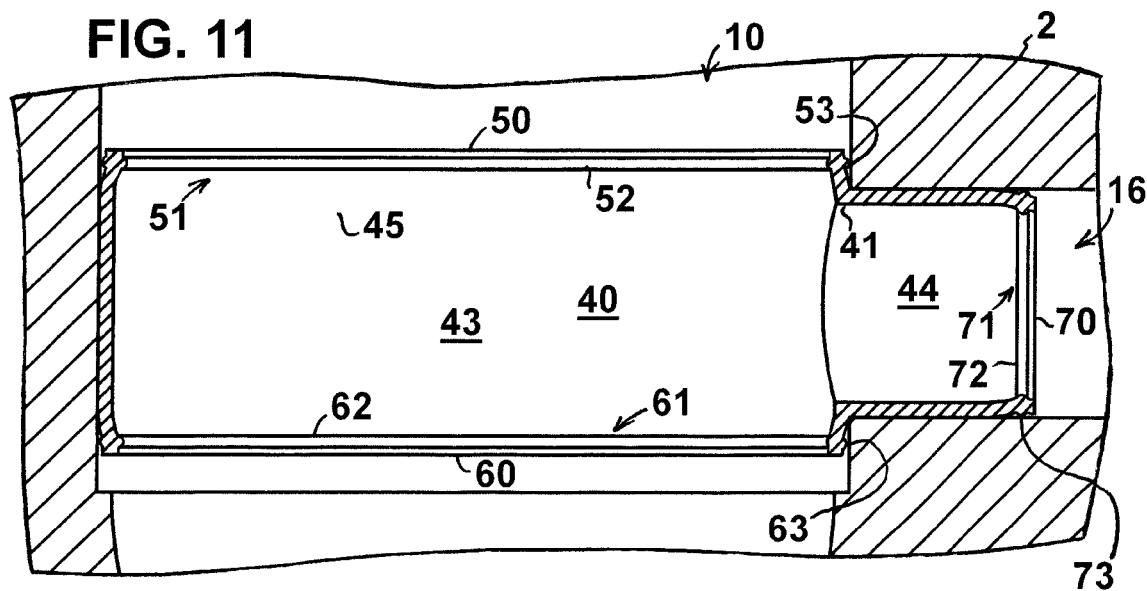

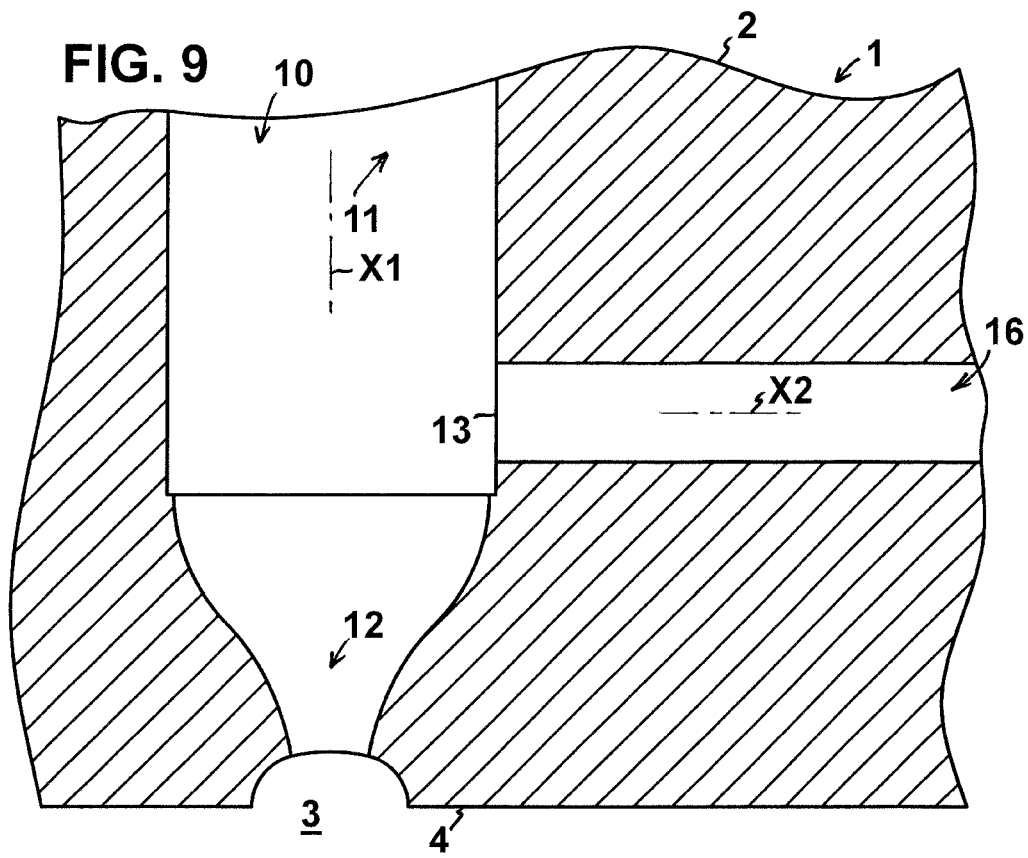
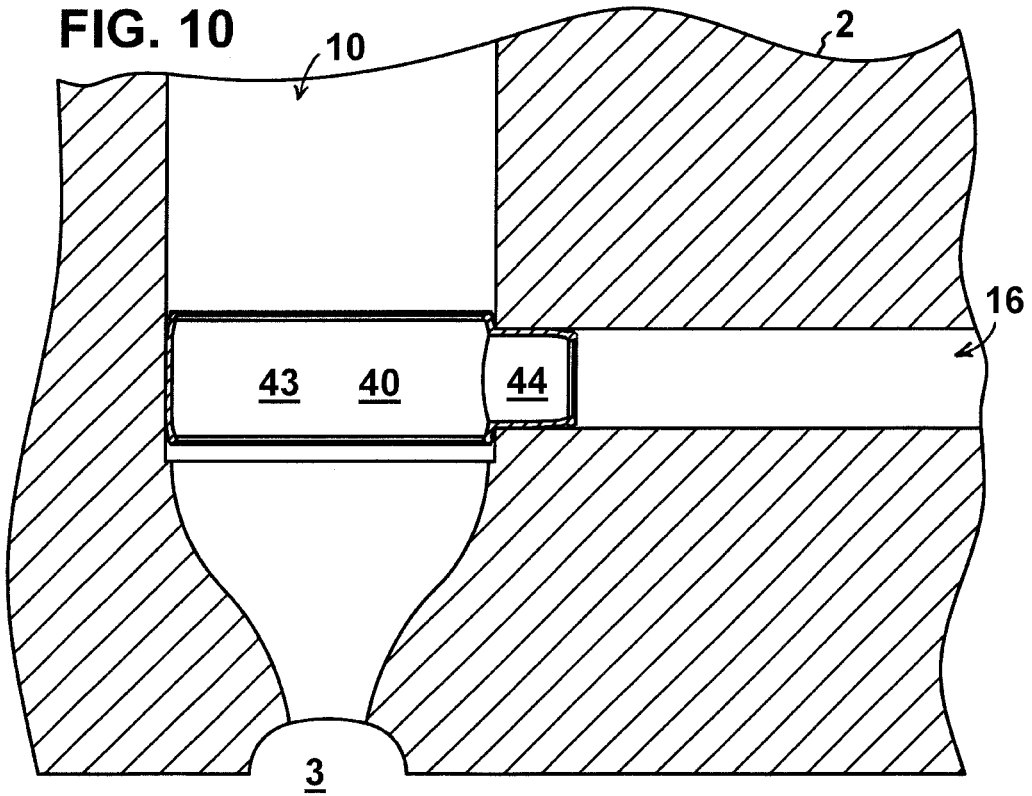

SEAL AND METHOD FOR A FUEL GAS SUPPLY TO A PRE-COMBUSTION CHAMBER

This patent application is a 35 USC § 371 U.S. national stage of International Application No. PCT/EP20201025059 filed on Feb. 10, 2020, which claims the benefit and priority of Great Britain Application No. 1902211.0 filed on Feb. 18, 2019, the disclosures of which are incorporated in their entirety by reference herein.

TECHNICAL FIELD

This disclosure relates to internal combustion engines having a pre-combustion chamber supplied with fuel gas, and specifically to methods of sealing the pipe carrying the fuel gas to the pre-combustion chamber installed in a cavity in the engine body.

BACKGROUND

Gas engines are often fitted with a pre-combustion chamber in fluid communication with the combustion chamber. Fuel gas is supplied directly to the pre-combustion chamber where it is ignited to detonate the main charge in the combustion chamber.

The fuel gas may be supplied via a pipe which extends through a passageway in the engine body (typically the cylinder head) to a cavity in the cylinder head in which a chamber body defining the pre-combustion chamber is housed.

It is necessary to seal the pipe in fluid communication with the pre-combustion chamber to prevent the fuel gas from leaking.

In one conventional arrangement, the fuel gas supply pipe is sealed to the chamber body within the cylinder head by means of a metal sealing tube arranged between the outlet end of the pipe and the inlet orifice of the chamber body, with metal-to-metal interference contact all around its circumference at each end of the tube.

This requires accurate dimensional and surface quality control and so is a technically demanding and expensive solution.

Care is also required to exactly align the inlet orifice of the chamber body with the pipe, and to avoid unseating the chamber body in the cavity of the cylinder head by the sealing force which is applied to the tubular seal by axial compression of the pipe.

There may also be difficulty in remaking the seal satisfactorily after maintenance.

In another conventional arrangement, the fuel gas supply pipe and the chamber body are sealed to the cylinder head, each by means of a separate group of O-ring seals, so that an inner end region of the passageway in the cylinder head in which the fuel gas supply pipe is installed forms a conduit for conveying the fuel gas from the outlet end of the fuel gas supply pipe to the inlet orifice of the pre-combustion chamber.

The O-rings are relatively soft and so care must be taken to avoid damaging them during installation by abrasion against the material of the cylinder head as they are inserted together with the chamber body or fuel gas supply pipe into the respective passageway or cavity of the cylinder head.

Moreover, since the cylinder head may be made from a relatively more porous material than the gas inlet pipe and the chamber body, its porosity must be carefully controlled to avoid leakage of the fuel gas through the cylinder head into the ambient environment or coolant passages.

SUMMARY

In a first aspect, the present disclosure provides a seal for use in an apparatus for supplying fuel gas to an internal combustion engine.

The internal combustion engine includes an engine body, the engine body defining a combustion chamber, a cavity communicating with the combustion chamber, and a passageway communicating with the cavity.

The apparatus includes a chamber body defining a pre-combustion chamber, and a pipe.

The pipe is arranged to supply fuel gas to the pre-combustion chamber in a use position of the apparatus wherein the chamber body is installed in the cavity of the engine body with the pre-combustion chamber in fluid communication with the combustion chamber of the engine, and the pipe is installed in the passageway of the engine body in fluid communication with the pre-combustion chamber of the chamber body.

The seal includes a wall, the wall surrounding an interior space and including first and second portions. The interior space opens through the wall at first, second and third openings.

The first portion extends between the first and second openings, while the second portion extends between the third opening and the first portion.

The first portion includes a first sealing region arranged between the first opening and the second portion, and a second sealing region arranged between the second opening and the second portion.

Each of the first and second sealing regions is configured to sealingly engage the chamber body when the chamber body is received in the interior space to extend through the first and second sealing regions in the use position of the apparatus.

The second portion includes a third sealing region arranged between the third opening and the first portion, the third sealing region being configured to sealingly engage the pipe when the pipe is received in the interior space to extend through the third sealing region in fluid communication with the pre-combustion chamber of the chamber body in the use position of the apparatus.

In embodiments, the wall may define oppositely directed, internal and external surfaces, the internal surface bounding the interior space, with the internal surface of the wall in each of the first, second and third sealing regions defining a respective one of first, second and third, inner annular ribs, each of the inner annular ribs encircling the interior space in the respective one of the first, second and third sealing regions. In such embodiments, the external surface of the wall in each of the first, second and third sealing regions may define a respective one of first, second and third, outer annular ribs, each of the outer annular ribs encircling the interior space in the respective one of the first, second and third sealing regions.

In embodiments, the first portion may extend along a first axis passing through the first and second openings, with the second portion extending along a second axis, the second axis being acollinear with the first axis and passing through the third opening.

In embodiments, the wall may include a unitary body of elastomeric material defining both of the first and second portions.

In a related aspect, the disclosure provides an apparatus for supplying fuel gas to an internal combustion engine, the apparatus comprising a chamber body defining a pre-combustion chamber, a pipe, and a seal, as described above.

In a further related aspect, the disclosure provides an internal combustion engine including an engine body, and an apparatus comprising a chamber body defining a pre-combustion chamber, a pipe, and a seal, as described above, the apparatus being installed in the engine body in the use position.

In embodiments, the wall in each of the first and second sealing regions may be arranged in compression between the engine body and the chamber body, with the wall in the third sealing region being arranged in compression between the engine body and the pipe.

In another aspect, the disclosure provides a method for supplying fuel gas to an internal combustion engine, the internal combustion engine including an engine body, the engine body defining a combustion chamber, a cavity communicating with the combustion chamber, and a passageway communicating with the cavity.

The method includes providing an apparatus including a chamber body defining a pre-combustion chamber, a pipe, and a seal.

The seal includes a wall, the wall surrounding an interior space and including first and second portions. The interior space opens through the wall at first, second and third openings.

The first portion extends between the first and second openings, and the second portion extends between the third opening and the first portion.

The first portion includes a first sealing region arranged between the first opening and the second portion, and a second sealing region arranged between the second opening and the second portion.

The second portion includes a third sealing region arranged between the third opening and the first portion.

The method further includes installing the apparatus in the engine body, wherein: the first portion of the wall is arranged in the cavity; the second portion of the wall is arranged in the passageway; the chamber body is received in the interior space of the seal to extend through the first and second sealing regions within the cavity of the engine body, with the pre-combustion chamber in fluid communication with the combustion chamber; the pipe is received in the interior space of the seal to extend through the third sealing region within the passageway of the engine body, in fluid communication with the pre-combustion chamber of the chamber body to supply fuel gas to the pre-combustion chamber; each of the first and second sealing regions is sealingly engaged with the chamber body; and the third sealing region is sealingly engaged with the pipe.

In embodiments, the seal may be installed in the engine body before introducing the chamber body and the pipe into the interior space of the seal.

In embodiments, the wall in each of the first and second sealing regions may be arranged in compression between the engine body and the chamber body, with the wall in the third sealing region being arranged in compression between the engine body and the pipe.

The optional features of the above mentioned embodiments may be combined together as appropriate in any desired combination.

BRIEF DESCRIPTION OF THE DRAWINGS

Further features and advantages will become evident from the following illustrative embodiment comprising a seal which will now be described, purely by way of example and without limitation to the scope of the claims, and with reference to the accompanying drawings, in which:

FIG. 3 is a side view of the seal;
FIG. 4 is a longitudinal section through the seal at IV-IV of FIG. 1;
FIG. 9 is a central longitudinal section through a cavity and passageway in an engine body;
FIG. 10 is a view corresponding to FIG. 9 showing the seal installed in the cavity and passageway of the engine body, the seal also being shown in central longitudinal section as seen in FIG. 4;
FIG. 11 is an enlarged view of a portion of FIG. 10.

Figure 1:
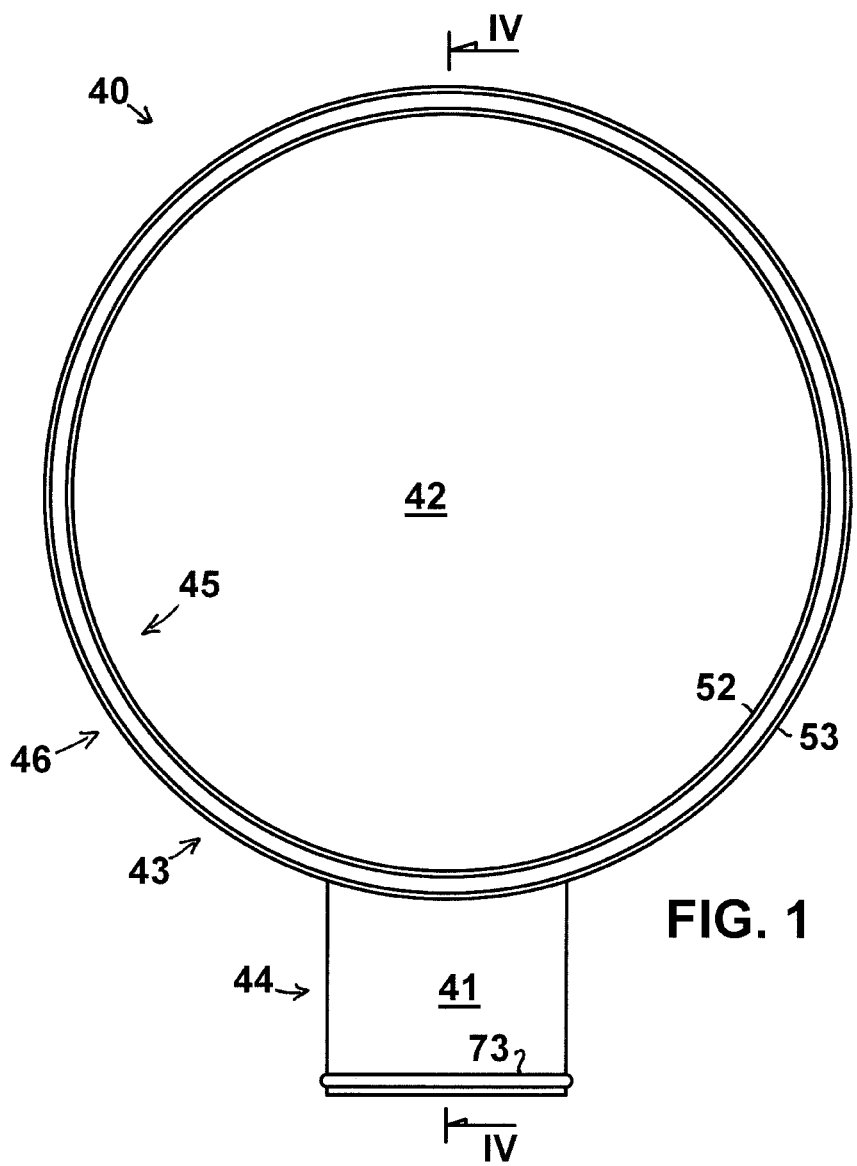
FIG. 1 is an end view of the seal.
Figure 2:
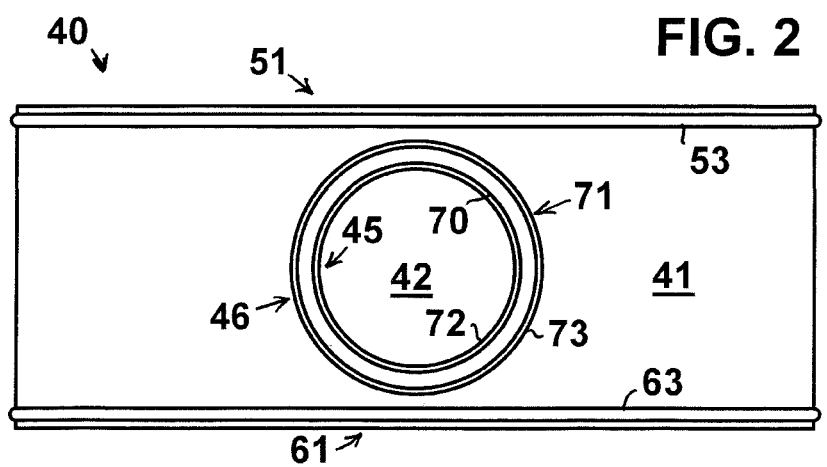
FIG. 2 is a front view of the seal.

Reference numerals and characters appearing in more than one of the figures indicate the same or corresponding features in each of them.

DETAILED DESCRIPTION

Referring to the figures, an apparatus includes a chamber body 20, a pipe 30, and a seal 40 as further explained below.

Referring to FIG. 9, an internal combustion engine 1 includes an engine body 2 which defines a combustion chamber 3, a cavity 10 communicating with the combustion chamber 3, and a passageway 16 communicating with the cavity 10.

The engine 1 may be a gas engine, which is to say, an engine fueled by a fuel gas which exists in gaseous form at ambient temperature and pressure and is supplied in gaseous form to the engine. The engine body 2 may be a cylinder head of the engine, which may be made from a monolithic block of solid material such as cast iron, with the lower surface 4 of the cylinder head forming an upper wall of the combustion chamber, the remaining walls of the combustion chamber being formed by another part of the engine body (not shown), optionally with a liner, as known in the art. The combustion chamber may be one of several combustion chambers, each of which may contain a piston, the pistons driving a crankshaft, and may be supplied with a mixture of fuel gas and air via individual or combined inlet valves (not shown). The remaining details of the engine are conventional as well known in the art.

An upper end region 11 of the cavity 10 may open at an external surface (not shown) of the engine body 2, for example, at an upper surface of the cylinder head, so that the chamber body 20 can be inserted via its upper end region 11 into the cavity. The cavity 10 may be generally cylindrical about its central longitudinal axis X1 which lies in the plane of the section of FIG. 9, and may narrow towards its opposite or lower end region 12 which opens into the combustion chamber 3.

The passageway 16 opens into the cavity 10 at an opening 13 and may be generally cylindrical about its central length axis X2 which lies in the plane of the section of FIG. 9. The inner surface of the passageway may include a smooth, annular, and optionally cylindrical region which encircles its central length axis X2 proximate the opening 13 to engage the third sealing region of the seal 40 in compression in the use position as further explained below.

The inner surface of the cavity 10 may include smooth, annular, and optionally cylindrical regions which encircle the central longitudinal axis X1 of the cavity to engage respectively the first and second sealing regions of the seal 40 in compression in the use position as further explained below, with the opening 13 being arranged axially in-between these smooth, annular regions when considered along the direction of the central longitudinal axis X1 of the cavity 10.

Both the cavity 10 and the passageway 16, at least in the region comprising the opening 13, may be formed in a unitary body of material forming the cylinder head or engine body, for example, by casting and/or machining a monolithic block of cast iron or other material.

Figure 5:
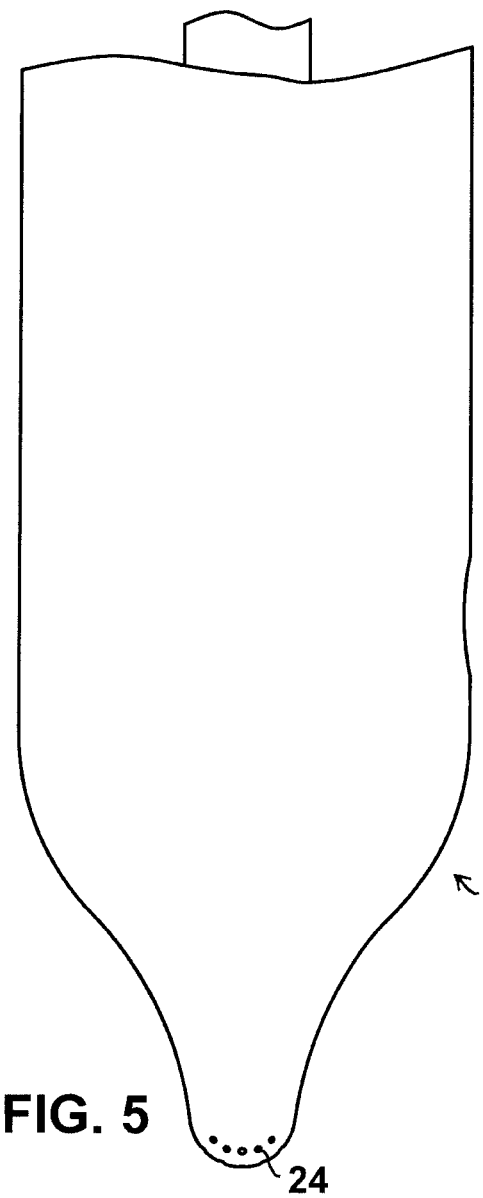
FIG. 5 is a side view of a chamber body defining a pre-combustion chamber.
Figure 6:
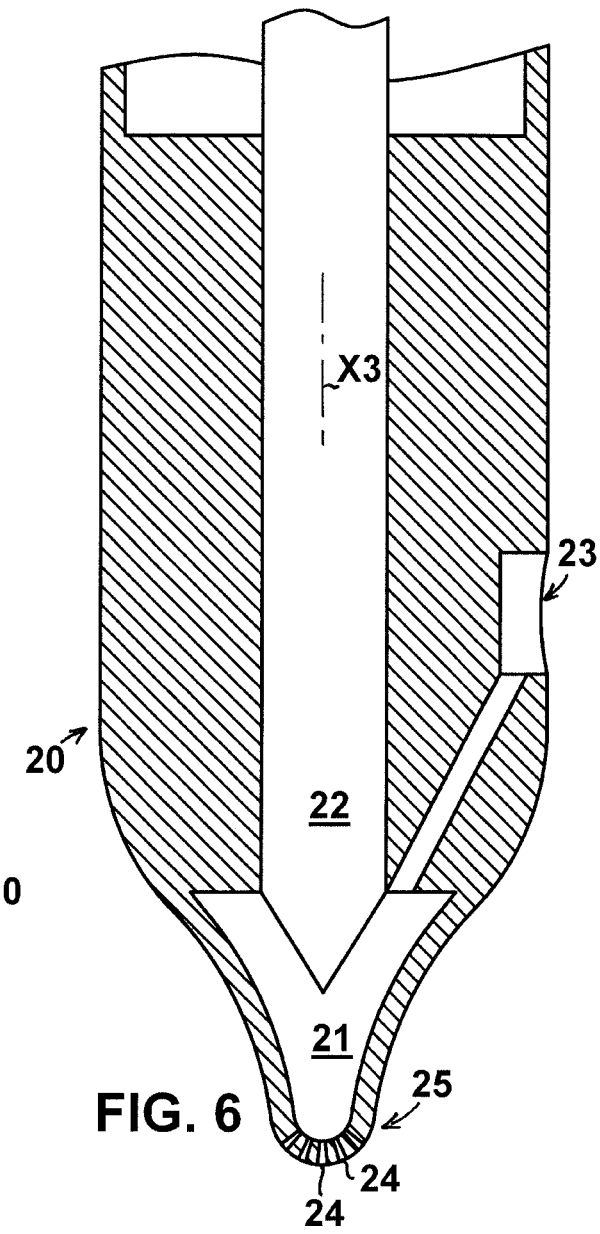
FIG. 6 is a central longitudinal section through the chamber body.

Referring to FIGS. 5 and 6, the chamber body 20 may be made from a suitable metal and defines within the chamber body a pre-combustion chamber 21. The metal or other material of the chamber body 20 may be less permeable by the fuel gas than the material of the engine body 2.

In this specification, a pre-combustion chamber means a chamber that is supplied with fuel gas which is ignited to assist in igniting the charge or mixture in the combustion chamber.

An igniter assembly 22 may be arranged in the chamber body to extend into the pre-combustion chamber 21. The igniter assembly 22 may comprise a spark igniter for causing a spark in the pre-combustion chamber responsive to an electrical ignition current. Alternatively or additionally, the igniter assembly 22 may comprise a fuel injector for injecting a liquid fuel into the pre-combustion chamber which is ignited by compression of the charge in the combustion chamber 3 or by the spark from the spark igniter. The igniter assembly 22 may controlled via electrical and/or fluid connections (not shown) connected to the engine ignition system and/or fuel supply system (not shown) via the upper end region 26 of the chamber body.

The pre-combustion chamber is arranged to receive fuel gas G via a fuel gas supply inlet 23 in the chamber body, and also fluidly communicates with an exterior of the chamber body via one or more outlet orifices 24 which may be arranged at a tip 25 of the chamber body.

A valve assembly (not shown), optionally with an actuation assembly controlled by the engine control system (not shown) may also be arranged in the chamber body 20 to control the flow of fuel gas via the fuel gas supply inlet 23 and retain pressure in the combustion chamber 3.

The chamber body 20 may be generally cylindrical about its central length axis X3, which lies in the plane of the section of FIG. 6, at least in that portion of its axial length in which the fuel gas supply inlet 23 is located. The fuel gas supply inlet 23 may open through the exterior surface of the chamber body 20 between two generally smooth, annular, and optionally cylindrical regions of the exterior surface of the chamber body which engage respectively the first and second sealing regions of the seal 40 in compression in the use position as further explained below.

Figure 7:
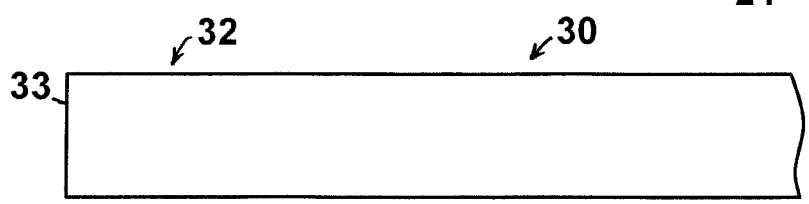
FIG. 7 is a side view of a pipe.
Figure 8:
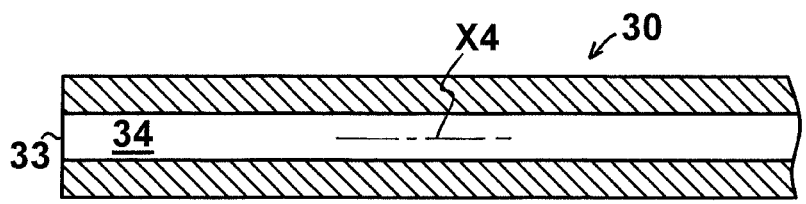
FIG. 8 is a central longitudinal section through the pipe.

Referring to FIGS. 7 and 8, the pipe 30 is provided to supply fuel gas to the pre-combustion chamber 21. The pipe 30 may be generally cylindrical as shown about its central length axis X4, which lies in the plane of the section of FIG. 8, and may be made for example from a suitable metal. The metal or other material of the pipe may be less permeable by the fuel gas than the material of the engine body 2. The pipe may include a generally smooth, annular, and optionally cylindrical region encircling its central length axis X4 and forming part of its external surface 32 proximate its outlet end 33 at which its internal bore or lumen 34 opens, and positioned to engage the third sealing region of the seal 40 in compression in the use position as further explained below.

Referring to FIGS. 1-4, the seal 40 includes a wall 41 which surrounds an interior space 42 of the seal. The wall 40 includes a first portion 43 and a second portion 44.

The interior space 42 opens through the wall 41 at a first opening 50, a second opening 60, and a third opening 70.

The first portion 43 of the wall extends between the first and second openings 50, 60, while the second portion 44 extends between the third opening 70 and the first portion 43 of the wall.

The first portion 43 of the wall includes a first sealing region 51 arranged between the first opening 50 and the second portion 44 of the wall, and a second sealing region 61 arranged between the second opening 60 and the second portion 44 of the wall.

The second portion 44 of the wall includes a third sealing region 71 arranged between the third opening 70 and the first portion 43 of the wall.

It can be seen that the wall 41 defines oppositely directed, internal and external surfaces 45, 46. The internal surface 45 bounds the interior space 42. The first and second portions 43, 44 may be formed integrally with each other and may form a continuous barrier so that the internal surface 45 is unbroken between the three sealing regions 51, 61, 71 except by the fluid passageway forming the interior space 42 and opening through the wall at the three openings 50, 60, 70.

The wall 41 may include or consist of a unitary body of elastomeric material defining both of the first and second portions 43, 44. The elastomeric material may be selected for resistance to the fuel gas and other service conditions.

The wall 41 may include a unitary body of elastomeric material defining both of the first and second portions 43, 44 and a reinforcement or framework, made for example from metal or plastics material, which may be relatively more stiff or less elastic than the elastomeric material while still allowing elastic deformation of the wall during installation of the seal. The reinforcement or framework may support the elastomeric material and help to maintain the sealing regions in the correct, use position after the seal is located in the cavity and passageway and while the chamber body and pipe are introduced through the openings to energise the sealing regions by compression between the chamber body or pipe and the engine body.

The seal 40 may be made by moulding, and may consist essentially of the wall 41.

The first portion 43 of the wall may extend along a first axis X5 passing (optionally, centrally) through each of the first and second openings 50, 60, with the second portion 44 extending along a second axis X6, the second axis X6 being acollinear (which is to say, not collinear) with the first axis X5 and passing (optionally, centrally) through the third opening 70, for example, as shown.

The second axis X6 may be normal to the first axis X5 as shown, or may intersect the first axis X5 at an acute angle when considered in, or projected onto, a plane containing the first axis X5 (such as the plane of FIG. 4).

The first portion 43 of the wall may form a first cylinder, and the second portion 44 may form a second, optionally smaller, cylinder extending radially outwardly from the first cylinder, for example, as shown.

The internal surface 45 of the wall 41 in each of the first, second and third sealing regions 51, 61, 71 may define a respective one of first, second and third, inner annular ribs 52, 62, 72, each of the inner annular ribs encircling the interior space 42 in the respective one of the first, second and third sealing regions.

Alternatively or additionally, the external surface 46 of the wall 41 in each of the first, second and third sealing regions 51, 61, 71 may define a respective one of first, second and third, outer annular ribs 53, 63, 73, each of the outer annular ribs encircling the interior space 42 in the respective one of the first, second and third sealing regions.

Alternatively, only one or two of the inner and/or outer annular ribs may be provided. For example, the inner and/or outer annular ribs may be provided in the first and second sealing regions, or in the third sealing region.

Where both inner and outer annular ribs are provided in one or more of the sealing regions, the inner and outer annular ribs may be arranged opposite each other (which is to say, oppositely directed and at the same axial position relative to the length axis of the respective portion of the wall), as shown. Each rib may be formed with a rounded, optionally semicircular profile as shown, or with a square or other angular profile as known in the art to ease installation and provide effective sealing. More than one internal and/or external rib may be arranged in the or each sealing region.

Referring now to FIGS. 10-13, in the use position of the apparatus the chamber body 20 is installed in the cavity 10 of the engine body 2 with the pre-combustion chamber 21 in fluid communication with the combustion chamber 3 of the engine, and the pipe 30 is installed in the passageway 16 of the engine body 2 in fluid communication with the pre-combustion chamber 21 of the chamber body 20, with the seal 40 being arranged to enclose both components in the region where they meet to prevent the fuel gas from leaking from the fluid connection between the pipe 30 and the pre-combustion chamber 21, as will now be explained.

The seal 40 is installed in the engine body 2 so that the first portion 43 of the wall 41 is arranged in the cavity 10, and the second portion 44 of the wall 41 is arranged in the passageway 16, as shown in FIGS. 10 and 11.

The seal 40 may be installed in the engine body 2 before introducing the chamber body 20 and the pipe 30 into the interior space of the seal as explained below. This helps to minimise sliding contact between the seal and the adjacent surfaces so as to ensure that the seal is not damaged during installation.

The seal 40 including the wall 41 may be elastically deformable so that it can be folded or rolled or squashed into a suitable shape to insert it into the cavity 10, whereupon the first and second portions 43, 44 of the wall elastically return to their original shape (defined for example during moulding of the wall 41) within the interior space of the cavity 10 and the passageway 16.

Where the sealing regions 51, 61, 71 are provided with outer annular ribs 53, 63, 73, the outer annular ribs 53, 63, 73 may be compressed respectively against the corresponding smooth, annular regions of the cavity 10 and passageway 16 as shown in FIG. 11.

Figure 12:
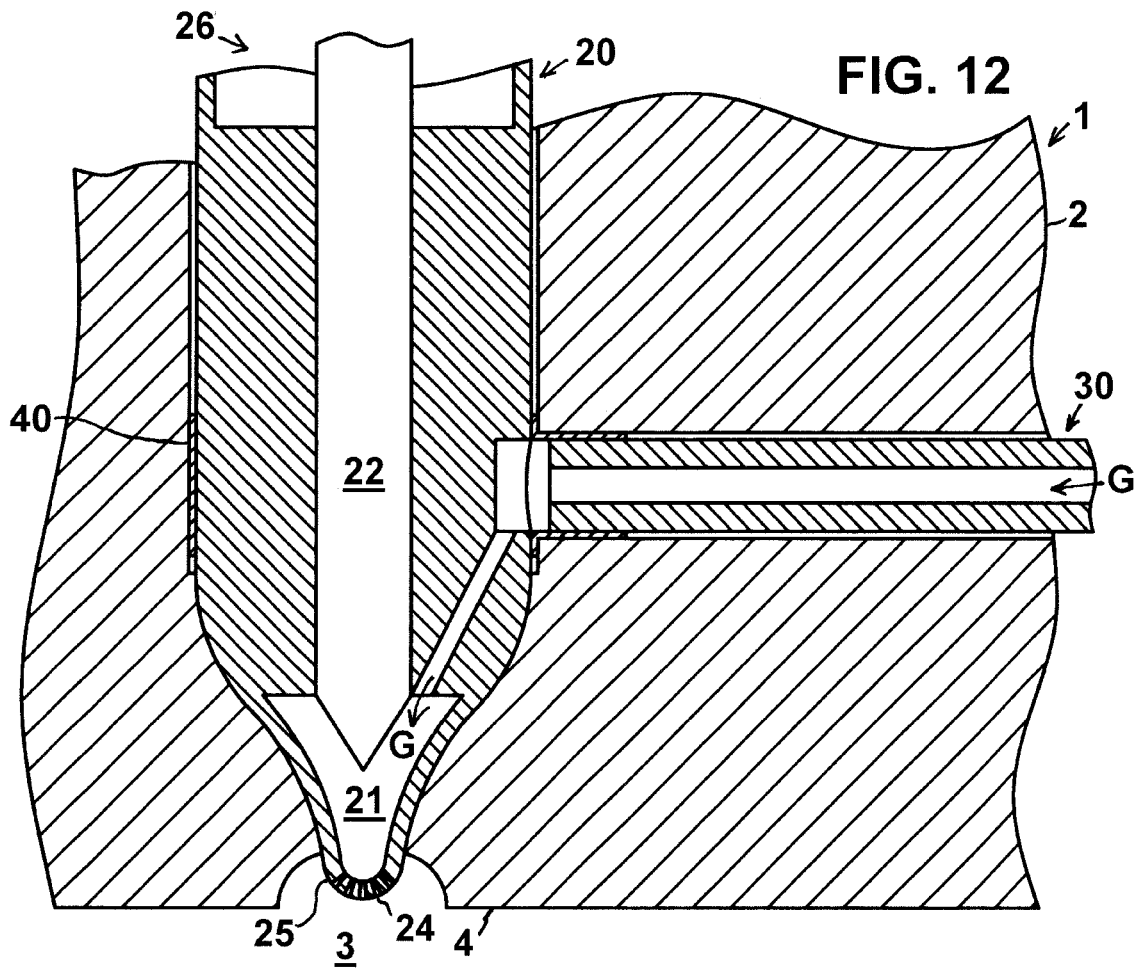
FIG. 12 is a view corresponding to FIG. 10 showing the chamber body and the pipe installed in the seal in a use position of the apparatus, the chamber body and the pipe also being shown in central longitudinal section as seen in FIGS. 6 and 8.
Figure 13:
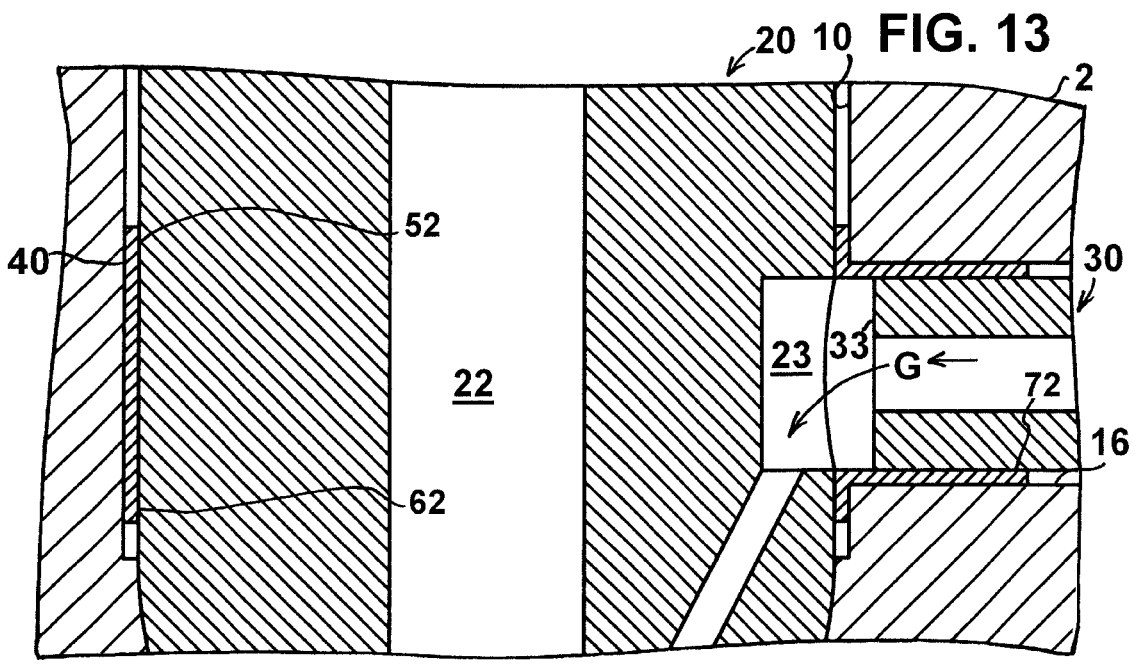
FIG. 13 is an enlarged view of a portion of FIG. 12.

The chamber body 20 is inserted slidingly into the cavity 10, for example, along its central length axis X1 via its open, upper end region 11, and passes slidingly through the first opening 50 so that the chamber body 20 is received in the interior space 42 of the seal 40 to extend through the first and second sealing regions 51, 61 within the cavity 10 in its use position as shown in FIGS. 12 and 13.

In this position as shown, the tip 25 of the chamber body 20 extends into the combustion chamber 3 so that the pre-combustion chamber 21 is in fluid communication with the combustion chamber 3 via the outlet orifices 24. The chamber body 20 may be sealed proximate its tip 25 by contact with the engine body 2 at the narrowed neck in the lower end region 12 of the cavity 10, optionally with a further seal (not shown) being arranged in this region to retain pressure in the combustion chamber 3.

The pipe 30 is inserted slidingly into the passageway 16 along its central length axis X2 and is received in the interior space 42 of the seal 40 to extend through the third sealing region 71 within the passageway 16. In its use position the internal bore or lumen 34 of the pipe is in fluid communication via the fuel gas supply inlet 23 of the chamber body 20 with the pre-combustion chamber 21.

The supply end (not shown) of the pipe 30 is connected to the fuel gas supply of the engine to supply fuel gas G to the pre-combustion chamber 21.

References to the chamber body 20 or the pipe 30 being "received in" the interior space 42 of the seal should be construed to mean that at least a part of the chamber body or the pipe is received in the interior space 42 of the seal so that the or each respective sealing region encircles (i.e. extends entirely around) the respective part to provide a complete seal. As shown in the illustrated example, in the use position of the apparatus the chamber body 20 may extend through the interior space 42 of the seal and through its first and second openings 50, 60, while the pipe 30 extends through the third opening 70 into the interior space 42 of the seal to terminate at its outlet end 33 within the interior space 42 of the seal.

By assembling the seal 40 together with the chamber body 20 and the pipe 30 in the confined space of the cavity 10 and the passageway 16, each of the first and second sealing regions 51, 61 is sealingly engaged with the external surface of the chamber body 20 and the third sealing region 71 is sealingly engaged with the external surface of the pipe 30, as shown.

Thus it can be seen that each of the first and second sealing regions 51, 61 is configured to sealingly engage the chamber body 20 when the chamber body 20 is received in the interior space 42 of the seal to extend through the first and second sealing regions 51, 61, while the third sealing region 71 is configured to sealingly engage the pipe 30 when the pipe 30 is received in the interior space 42 of the seal to extend through the third sealing region 71 in fluid communication with the pre-combustion chamber 21 in the use position of the apparatus as shown in FIGS. 12 and 13.

The wall 41 in each of the first and second sealing regions 51, 61 may be arranged in compression between the engine body 2 and the chamber body 20, while the wall 41 in the third sealing region 71 is arranged in compression between the engine body 2 and the pipe 30.

Where the sealing regions 51, 61, 71 are provided with inner annular ribs 52, 62, 72, the inner annular ribs 52, 62, 72 may be compressed respectively against the respective smooth, annular regions of the chamber body 20 and the smooth, annular region of the pipe 30 as previously described and best seen in FIG. 13.

Where as illustrated the inner annular ribs are arranged opposite the respective, outer annular ribs, the corresponding smooth, annular regions of the chamber body 20 and pipe 30 are arranged opposite (i.e. at the same position along the respective axis of the cavity or pipe) to the corresponding smooth, annular regions of the cavity 10 and passageway 16 in the use position.

The outer surfaces of the chamber body 20 and the pipe 30 including said smooth, annular regions may be contoured to slidingly engage and compress and so, progressively energise the sealing regions of the seal, including where provided the annular ribs, as they advance to the installed, use position.

In FIG. 13 it can be seen that the sealing regions 51, 61 encircle the chamber body 20 axially on either side of the fuel gas supply inlet 23 of the chamber body 20, so that by energising the sealing regions 51, 61 an annular portion of the external surface of the chamber body 20 including the fuel gas supply inlet 23 is fluidly isolated within the interior space 42 of the seal 40 in fluid communication only with the internal bore or lumen 34 of the pipe. This provides a gas tight seal and ensures that the fuel gas does not come into contact with the engine body 2 in the region of the fluid connection between the pipe 30 and the chamber body 20.

INDUSTRIAL APPLICABILITY

The seal 40 may be installed by elastically deforming it before introducing it into the cavity and passageway of the engine body 2, and may be removed in the same way. Since all three sealing regions are united by the wall 41 of the seal they are supported by the wall 41 in the correct installed position while the chamber body and pipe are introduced through the openings 50, 60, 70 of the seal inside the engine body 2, providing a simpler assembly and maintenance procedure where fuel gas is supplied to the pre-combustion chamber of an engine.

The seal 40 forms an impermeable shroud surrounding the interface between the fuel gas supply pipe 30 and the chamber body 20 and sealed to respective outer surface portions of both components to enclose the interface. This prevents fuel gas from escaping from the interface via the cylinder head, irrespective of its relative porosity.

The seal 40 accommodates small variations in the position of the chamber body 20 relative to the fuel gas supply pipe 30 and so provides easier and more satisfactory installation and sealing of both parts, which is not compromised by small relative movements between them.

In summary, fuel gas G is supplied via a pipe 30 to a pre-combustion chamber 21 of an internal combustion engine 1. The pre-combustion chamber 21 is formed inside a chamber body 20 which is received in a cavity 10 of the engine body 2, while the pipe 30 is received in a passageway 16 of the engine body 2 which communicates with the cavity 10. A seal 40 which may be made from an elastomer comprises a wall 41 defining an interior space 42 opening through the wall 41 at first, second and third openings 50, 60, 70. A first portion 43 of the wall 41 defining the first and second openings 50, 60 is arranged in the cavity 10 so that the chamber body 20 can be inserted through the openings 50, 60 into the interior space 42 of the seal, while a second portion 44 of the wall 41 comprising the third opening 70 is received in the passageway 16 so that the pipe 30 can be inserted into the interior space 42 of the seal via the third opening 70. The pipe 30 is sealed in fluid communication with the pre-combustion chamber 21 via an inlet 23 in the chamber body 20 by sealing regions 51, 61, 71 of the seal which may be arranged proximate the respective openings 50, 60, 70.

Many further adaptations are possible within the scope of the claims.

In the claims, reference numerals and characters are provided in parentheses, purely for ease of reference, and should not be construed as limiting features.

The invention claimed is:

1. A seal for use in an apparatus for supplying fuel gas (G) to an internal combustion engine,
the internal combustion engine including an engine body, the engine body defining:
a combustion chamber,
a cavity communicating with the combustion chamber, and
a passageway communicating with the cavity;
the apparatus including:
a chamber body defining a pre-combustion chamber, and
a pipe;
the pipe being arranged to supply fuel gas (G) to the pre-combustion chamber in a use position of the apparatus wherein the chamber body is installed in the cavity of the engine body with the pre-combustion chamber in fluid communication with the combustion chamber of the engine, and the pipe is installed in the passageway of the engine body in fluid communication with the pre-combustion chamber of the chamber body;
wherein the seal includes a wall, the wall surrounding an interior space and including first and second portions;
the interior space opening through the wall at first, second and third openings;
the first portion extending between the first and second openings, the second portion extending between the third opening and the first portion;
the first portion including:
a first sealing region arranged between the first opening and the second portion, and
a second sealing region arranged between the second opening and the second portion;
each of the first and second sealing regions being configured to sealingly engage the chamber body when the chamber body is received in the interior space to extend through the first and second sealing regions in the use position of the apparatus;
the second portion including a third sealing region arranged between the third opening and the first portion,
the third sealing region being configured to sealingly engage the pipe when the pipe is received in the interior space to extend through the third sealing region in fluid communication with the pre-combustion chamber of the chamber body in the use position of the apparatus.

2. The seal according to claim 1, wherein the wall defines oppositely directed, internal and external surfaces, the internal surface bounding the interior space;
and the internal surface of the wall in each of the first, second and third sealing regions defines a respective one of first, second and third, inner annular ribs, each of the inner annular ribs encircling the interior space in the respective one of the first, second and third sealing regions.

3. The seal according to claim 2, wherein the external surface of the wall in each of the first, second and third sealing regions defines a respective one of first, second and third, outer annular ribs, each of the outer annular ribs encircling the interior space in the respective one of the first, second and third sealing regions.

4. The seal according to claim 1, wherein the first portion extends along a first axis (X5) passing through the first and second openings, and the second portion extends along a second axis (X6), the second axis (X6) being acollinear with the first axis (X5) and passing through the third opening.

5. The seal according to claim 1, wherein the wall includes a unitary body of elastomeric material defining both of the first and second portions.

6. An internal combustion engine including an engine body and an apparatus, the apparatus including a seal, a chamber body, and a pipe according to claim 1, the engine body defining:
   a combustion chamber,
   a cavity communicating with the combustion chamber, and
   a passageway communicating with the cavity;
   the apparatus being installed in the engine body in the use position,
   wherein the wall in each of the first and second sealing regions is arranged in compression between the engine body and the chamber body, and
   the wall in the third sealing region is arranged in compression between the engine body and the pipe.

7. A method for supplying fuel gas (G) to an internal combustion engine,
   the internal combustion engine including an engine body, the engine body defining:
      a combustion chamber,
      a cavity communicating with the combustion chamber, and
      a passageway communicating with the cavity;
   the method including:
      providing an apparatus including:
         a chamber body defining a pre-combustion chamber,
         a pipe, and
         a seal;
      the seal including a wall, the wall surrounding an interior space and including first and second portions;
      the interior space opening through the wall at first, second and third openings;
      the first portion extending between the first and second openings, the second portion extending between the third opening and the first portion;
      the first portion including:
         a first sealing region arranged between the first opening and the second portion, and
         a second sealing region arranged between the second opening and the second portion;
      the second portion including a third sealing region arranged between the third opening and the first portion;
   and installing the apparatus in the engine body, wherein:
      the first portion of the wall is arranged in the cavity;
      the second portion of the wall is arranged in the passageway;
      the chamber body is received in the interior space of the seal to extend through the first and second sealing regions within the cavity of the engine body, with the pre-combustion chamber in fluid communication with the combustion chamber;
      the pipe is received in the interior space of the seal to extend through the third sealing region within the passageway of the engine body, in fluid communication with the pre-combustion chamber of the chamber body to supply fuel gas (G) to the pre-combustion chamber;
      each of the first and second sealing regions is sealingly engaged with the chamber body; and
      the third sealing region is sealingly engaged with the pipe.

8. The method according to claim 7, wherein the seal is installed in the engine body before introducing the chamber body and the pipe into the interior space of the seal.

9. A method according to claim 7, wherein the wall in each of the first and second sealing regions is arranged in compression between the engine body and the chamber body, and
the wall in the third sealing region is arranged in compression between the engine body and the pipe.

* * * * *